(12) United States Patent
Ushio et al.

(10) Patent No.: US 6,463,667 B1
(45) Date of Patent: Oct. 15, 2002

(54) MACHINE TOOL PRECISION-MEASURING APPARATUS

(75) Inventors: Masaki Ushio, Kitakyushu (JP); Masahide Koya, Kitakyushu (JP); Hiromichi Matsuda, Kitakyushu (JP); Yoshihiko Yamaguchi, Fukuoka (JP)

(73) Assignees: Orio Precision Co., LTD, Fukuoka (JP); Fukuoka Prefectural Government, Fukuoka (JP); Japan Science and Technology Corporation, Saitama (JP)

( * ) Notice: Subject to any disclaimer, the term of this patent is extended or adjusted under 35 U.S.C. 154(b) by 76 days.

(21) Appl. No.: 09/662,908

(22) Filed: Sep. 15, 2000

(30) Foreign Application Priority Data

Sep. 20, 1999 (JP) .......................................... 11-264956

(51) Int. Cl.⁷ .............................................. G01C 25/00
(52) U.S. Cl. .............................. 33/502; 73/1.79; 33/1 M
(58) Field of Search ........................ 33/502, 1 M, 503, 33/567.1, DIG. 2; 73/1.79

(56) References Cited

U.S. PATENT DOCUMENTS

| | | | | |
|---|---|---|---|---|
| 4,369,581 A | * | 1/1983 | Lenz | 33/1 M |
| 4,477,978 A | * | 10/1984 | Azuma | 33/1 M |
| 4,882,847 A | * | 11/1989 | Hemmelgarn et al. | 33/1 M |
| 5,088,208 A | * | 2/1992 | Wells et al. | 33/1 M |
| 5,187,874 A | * | 2/1993 | Takahashi et al. | 33/502 |
| 5,533,271 A | * | 7/1996 | Callaghan, Jr. | 33/502 |
| 5,813,128 A | * | 9/1998 | Bailey | 33/502 |
| 6,249,985 B1 | * | 6/2001 | Piko et al. | 33/503 |

FOREIGN PATENT DOCUMENTS

| | | |
|---|---|---|
| JP | 61-131612 | 8/1986 |
| JP | 5-309548 | 11/1993 |
| JP | 7-239209 | 9/1995 |
| JP | H11-58182 | 3/1999 |

* cited by examiner

Primary Examiner—Christopher W. Fulton
(74) Attorney, Agent, or Firm—Armstrong, Westerman & Hattori, LLP

(57) ABSTRACT

A machine tool precision-measuring apparatus comprising: a first linear movement distance-measuring means 17 including a first slide shaft 11, a first slide bush 13 slidably attached to the first slide shaft 11, and a first distance sensor 15 for measuring a distance that the first slide shaft 11 relatively travels with respect to the first slide bush 13; and, a second linear movement distance-measuring means 18 including a second slide shaft 12 positioned across the first slide shaft 11, a second slide bush 14 connected to the first slide bush 13, the second slide bush 14 being slidably attached to the second slide shaft 12, and a second distance sensor 16 for measuring a distance that the second slide shaft 12 relatively moves with respect to the second slide bush 14. In use of this apparatus, a spindle of a machine tool to be measured is fixed to the first linear movement distance-measuring means 17, while the second linear movement distance-measuring means 18 is fixedly positioned on a base 22, whereby trajectories of the spindle moving in directions of X- and Y-axes are measured. Such a construction provides a machine tool precision-measuring apparatus 10 having a simpler structure, lighter weight, and portability.

7 Claims, 10 Drawing Sheets

(A)

(B)

MACHINE TOOL PRECISION-MEASURING APPARATUS

BACKGROUND OF THE INVENTION

This invention relates to an improved machine tool precision-measuring apparatus for measuring and rating the machining accuracy of a machine tool.

In a recent field of precision machining technology, a numerically controlled (NC) machine tool is required to provide high-precision machining. The NC machine tool is provided with an actuation-interpolating function for interpolating errors. There are methods for evaluating the function, such as e.g., an actual cutting process and a circular trajectory measuring method.

The actual cutting process includes the steps of: initially cutting a workpiece in practice using an end mill (cutting tool), which is mounted on a spindle of the NC machine tool through a tool holder etc.; then removing the workpiece from the NC machine tool in order to measure using precision measuring equipment how the processed workpiece is shaped; and, assessing errors in such measurements.

The circular trajectory measuring method includes the steps of: mounting a spherical surface receiver on a table of the NC machine tool, which spherical surface receiver has a receiving surface coincident with a sphere, and which receiving surface is made of a magnetically attracting material; positioning the sphere on the spherical surface receiver; mounting a spherical surface seat on the spindle of the NC machine tool, which spherical surface seat is provided with spherical projections, and further which spherical surface seat is made of a magnetically attracting material; placing a length-measuring machine therein, which measures a length using a differential transformer, and then permitting both ends of a radially extending length-measuring bar to be rotatably supported on the sphere and the spherical surface seat with the aid of magnets; then driving the spindle into circular movement about the center of the spherical surface receiver on the table in order to measure variations in length of the length-measuring bar; and, calculating a trajectory of the spindle and then evaluating errors in such a calculation.

However, the actual cutting process is unable to precisely measure a position of the spindle because two different errors commingle in results of the measurement. More specifically, machining errors caused by a cutting tool such as the end mill mingles with errors in trajectories of the NC machine tool.

In addition, the circular trajectory measuring method is unable to accommodate shapes except for an arcuate shape. For example, it is impossible to handle trajectories specified by either linear interpolation or NURBUS interpolation employing a functional equation that expresses a free curve.

In order to overcome the above problems, a measuring apparatus is disclosed in published Japanese Patent Application Laid-Open No. (Hei) 11-58182, as schematically illustrated in FIG. 10.

Referring to FIG. 10, a measuring apparatus 100 is shown having X- and Y-axes directed movable linear guide rails 111, 112 disposed above a base plate 110. These two movable linear guide rails 111, 112 extend in a perpendicular relationship to one another, while being disposed vertically above one another. The X-axis directed movable linear guide rail 111 has both ends positioned on support linear guide blocks 115, 116. The support linear guide blocks 115 and 116 are slid on fixed left and right linear guide rails 113 and 114, respectively. The support linear guide blocks 115 and 116 are movable in the direction of the Y-axis. The fixed left and right linear guide rails 113, 114 are laid on the base plate 110 along opposite edges of the base plate 110 in leftward and rightward directions thereof, respectively. Meanwhile, the Y-axis directed movable linear guide rail 112 has both ends positioned on support linear guide blocks 119, 120. The support linear guide blocks 119 and 120 are slid on fixed front and rear linear guide rails 117 and 118, respectively. The support linear guide blocks 119, 120 are movable in the direction of the X-axis. The fixed front and rear linear guide rails 117, 118 are laid on the base plate 110 along opposite edges of the base plate 110 in forward and rearward directions thereof, respectively. This structure allows the movable linear guide rails 111, 112 to travel in the directions of the Y and X-axes, respectively.

The measuring apparatus 100 has a main block 121 disposed at a position where the movable linear guide rails 111, 112 are perpendicular to one another. The main block 121 is formed by a rectangular box. The main block 121 is movable in the directions of the X- and Y-axes. The main block 121 is connected to a machine tool spindle 125 through a connecting shaft 124. Movement of the spindle 125 causes the main block 121 to be moved in union therewith. In addition, the movable linear guide rails 111, 112 are moved parallel to the respective directions of the Y and X-axes in association with the movement of the main block 121.

The movable linear guide rails 111, 112 have linear scales 126, 127 mounted thereon, respectively. The linear scale 126 is positioned on the top of the movable linear guide rail 111 along substantially the entire length thereof. The linear scale 127 is disposed on the bottom of the movable linear guide rail 112 along substantially the full length thereof. A position-detecting head (not shown) on the main block 121 reads respective graduations of the linear scales 126, 127, thereby allowing positional data on the spindle 125 to be detected. The measuring apparatus 100 having above system is able to measure trajectories of the moving spindle 125 except for circular trajectories of the spindle 125.

However, the prior art measuring apparatus 100 includes a total of six block portions in the directions of the X- and Y-axes, i.e., three for each direction, which block portions are slid on other members upon movement of the spindle 125. In addition, six rail members are required in order to support the block portions. The term "block portion" in this text denotes four-support linear guide blocks 115, 116, 119, 120 and two-through holes of the main block 121. The main block 121 has the through-holes formed therein in the directions of the X- and Y-axes, and further has the linear guide rails 111, 112 inserted through the through-holes. The term "rail member" used herein refers to the fixed linear guide rails 113, 114, 117, 118 and the movable linear guide rails 111, 112.

Consequently, the measuring apparatus 100 is complicated in structure and is made heavier in weight because of such a large number of constitutional members.

Furthermore, when the NC machine tools at different locations are to be measured, then the measuring apparatus 100 is so complicated in structure that it takes time to assemble and disassemble the measuring apparatus 100. In addition, the measuring apparatus 100 is heavy in weight, and is thus difficult to move. Further, since the measuring apparatus 100 includes a large number of members, it is time-consuming to adjust the measuring apparatus 100 after assembly thereof.

SUMMARY OF THE INVENTION

In view of the above, an object of the present invention is to provide a machine tool precision-measuring apparatus having a simpler structure, lighter weight, and portability.

In the machine tool precision-measuring apparatus fulfilling the above object comprises: a first linear movement distance-measuring means including a first slide shaft, a first slide bush slidably attached to the first slide shaft, and a first distance sensor for measuring a distance that the first slide shaft relatively travels with respect to the first slide bush; and, a second linear movement distance-measuring means including a second slide shaft positioned across the first slide shaft, a second slide bush connected to the first slide bush, the second slide bush being slidably attached to the second slide shaft, and a second distance sensor for measuring a distance that the second slide shaft relatively moves with respect to the second slide bush, wherein a spindle of a machine tool to be measured is fixed to the first linear movement distance-measuring means, while the second linear movement distance-measuring means is fixedly positioned on a base, whereby trajectories of the spindle moving in directions of X- and Y-axes are measured. When the spindle to be measured is fixed to the first distance-measuring means, it is preferred that the first distance-measuring means has a projecting mounting shaft provided on the top thereof, which mounting shaft is secured to a tool holder disposed below the spindle.

In the machine tool precision-measuring apparatus according to the present invention, the spindle of the machine tool is connected to one of the first slide shaft and the first slide bush. The other of the first slide shaft and the first slide bush, which is not fixed to the spindle, and one of the second slide shaft and the second slide bush are connected together in a state of they being positioned across one another. The other of the second slide shaft and the second slide bush, which is not connected to the first linear movement distance-measuring means, is fixedly disposed on the base. This structure provides a reduced number of the slide shafts, or rather two slide shafts, but is able to measure a trajectory of the spindle that provides substantially planar movement.

Thus, the machine tool precision-measuring apparatus has the first and second linear movement distance-measuring means connected together in an intersecting relationship to one another. In such a structure, two slide shafts are enough to measure the trajectory of the spindle moving in a plane. Consequently, the machine tool precision-measuring apparatus has a simplified structure and reduced weight, and is thus convenient to carry.

In the machine tool precision-measuring apparatus according to the present invention, pneumatic bearings using compression gases can be provided between the first slide shaft and the first slide bush and between the second slide shaft and the second slide bush, respectively. Namely, the pneumatic bearings are formed by streams of compressed gases in the gaps between the first and second slide shafts and the first and second bushes, respectively. The first and second slide bushes are complementary to the first and second slide shaft, respectively. The use of the pneumatic bearings permits the first and second slide shafts to be axially slid in non-contact with the first and second slide bushes, respectively. This feature obviates friction-caused exothermicity. In addition, such non-contacting slide provides reduced influence of vibrations, with a consequential increase in positional accuracy.

In the machine tool precision-measuring apparatus according to the present invention, the spindle is preferably joined to the first linear movement distance-measuring means so as to be relatively slidable vertically with respect to the first linear movement distance-measuring means. Alternatively, the first linear movement distance-measuring means is preferably attached to the second linear movement distance-measuring means so as to be relatively slidable vertically relative to the second linear movement distance-measuring means. As a further alternative, the second linear movement distance-measuring means is desirably fitted to the base so as to be relatively slidable vertically in relation to the base. Since the spindle of the machine tool to be measured is moved vertically relative to the base, the preceding structure permits such upward and downward movement of the spindle to be absorbed through sliding portions. As a result, errors in measurements can be reduced as a whole.

In the machine tool precision-measuring apparatus according to the present invention, the first linear movement distance-measuring means is attached to the second linear movement distance-measuring means so as to be relatively slidable vertically in relation to the second linear movement distance-measuring means. In addition, a third distance sensor is preferably provided for measuring a distance that the first distance-measuring means travels upward and downward. Consequently, it is possible to measure a trajectory of the spindle moving in a direction of a Z-axis as well. Such a construction measures the distance of upward and downward movement as well as a horizontal position. As a result, a trajectory of such a spatially moving spindle of the machine tool can be measured.

In the machine tool precision-measuring apparatus according to the present invention, the third distance sensor is preferably disposed on a third linear movement distance-measuring means so as to be able to measure a distance that a third slide shaft relatively travels with respect to a third slide bush. The third linear movement distance-measuring means includes the third slide shaft and the third slide bush. The third slide shaft is slidably attached to the third slide bush.

In addition, the third linear movement distance-measuring means is preferably connected to the first and second linear movement distance-measuring means in such a manner that they are all permitted to measure respective distances in intersecting directions. Further, pneumatic bearings using compressed gases are desirably formed between the first, second, third slide shafts and the first, second, third slide bushes, respectively. The first, second, and third bushes are complementary to the first, second, and third shafts, respectively. Streams of compressed gases are permitted to flow in the gaps between the first, second, third slide shafts and the first, second, third slide bushes, respectively. As a result, errors in measurements can be further reduced.

In particular, when the respective pneumatic bearings are formed between the first, second, third slide bushes and the first, second, third slide shafts, then reduced errors in a vertical direction as well as reduced sliding resistance are attainable for two-dimensional or three-dimensional measurement of the spindle. Such a feature is possible to render measurements more accurate.

DETAILED DESCRIPTION OF THE PREFERRED EMBODIMENTS

Embodiments of the present invention will now be described with reference to the accompanying drawings for a more complete understanding of the present invention.

Figure 1:
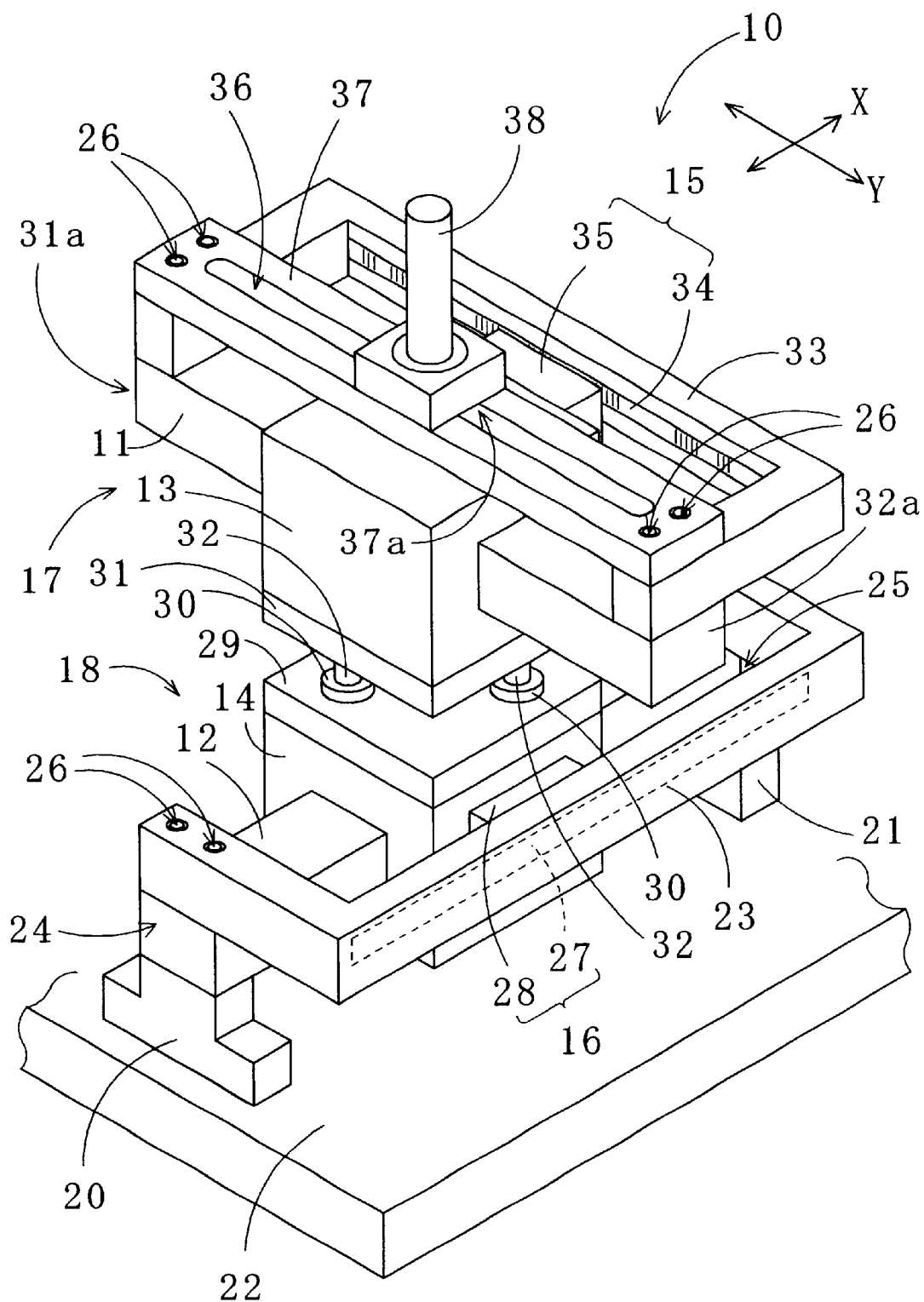
FIG. 1 is a perspective view, illustrating a machine tool precision-measuring apparatus according to an embodiment of the present invention.

FIG. 1 illustrates a machine tool precision-measuring apparatus 10 according to an embodiment of the present invention. The precision-measuring apparatus 10 includes linear movement distance-measuring means 17, 18 (first and second linear movement distance-measuring means). The distance-measuring means 17, 18 include slide shafts 11, 12 (first and second slide shafts), slide bushes 13, 14 (first and second slide bushes), and distance sensors 15, 16 (first and second distance sensors), respectively. The slide bushes 13, 14 have the slide shafts 11, 12 attached thereto so as to be slidable in directions of Y- and X-axes, respectively. The distance sensors 15, 16 measure distances that the slide shafts 11, 12 relatively travel with respect to the slide bushes 13, 14, respectively. Details of the above will be given below.

Initially, a description will be made as to how the slide shafts 11, 12 and the slide bushes 13, 14 are mounted together, respectively.

Figure 2:
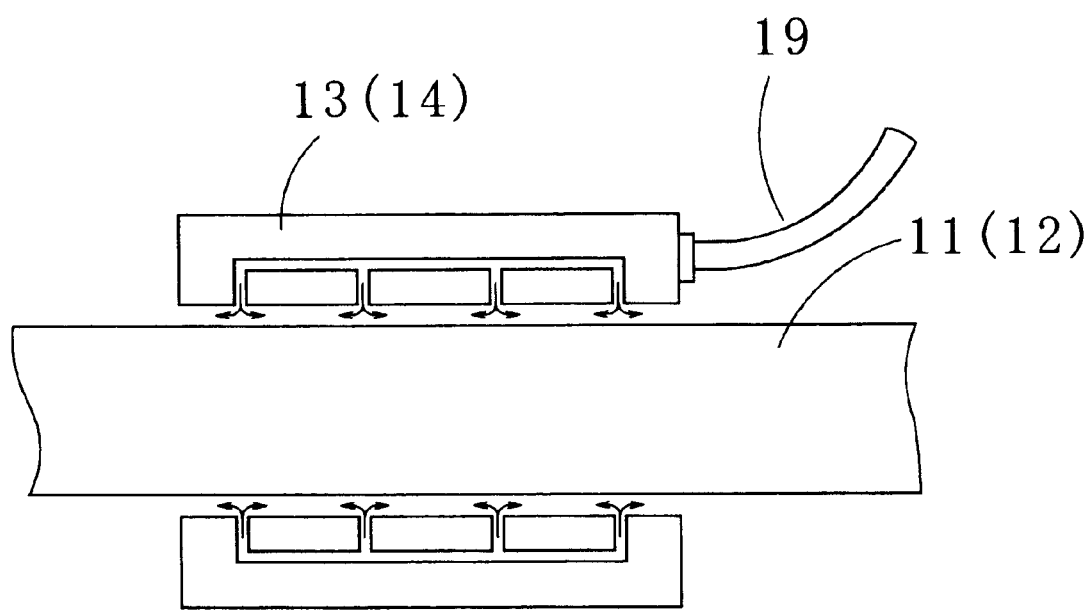
FIG. 2 is a cross-sectional view, illustrating a pneumatic bearing formed in the precision-measuring apparatus.

The slide shafts 11, 12 and the slide bushes 13, 14 are made of ceramics such as alumina. The slide bushes 13 and 14 are complementary to the slide shaft 11 and 12, respectively. Referring to FIG. 2, respective pneumatic bearings are formed between the slide shafts 11, 12 and the slide bushes 13, 14. In the pneumatic bearings, streams of compressed air as an example of compressed gases flow through the gaps formed between the shafts 11, 12 and the bushes 13, 14, respectively. The stream of air supplied to the slide bushes 13, 14 through a flexible tube 19 is then compressed to a pressure of some 4 kgf/cm$^2$ by means of a throttle (not shown). The compressed air is expelled to the slide shaft 11, 12. Such air jets cause static pressure, thereby creating the respective small gaps between the slide bushes 13, 14 and the slide shafts 11, 12.

The slide shafts 11, 12 and the slide bushes 13, 14 are made of ceramics, and thus offer the following advantages of: processing within highly fine limits due to a reduced degree of deformation; lighter weight due to low specific gravity; a considerably reduced change over many years of use; the slide shaft 11, 12 and the slide bushes 13, 14 being resistant to scoring because of enhanced abrasion resistance, even with contact with other objects; the slide shaft 11, 12 and the slide bushes 13, 14 being resistant to suffer from errors due to a change in temperature because of a small coefficient of thermal expansion; and, the slide shaft 11, 12 and bushes 13, 14 being resistant to corrosion, and further being impermeable by water, with the result of no expansive deformation.

In addition, the use of the non-contacting pneumatic bearings provides improved repeatability of a measured trajectory without a so-called stick slip or a phenomenon in which a sliding surface is driven into intermittent motion. Further, the slide shafts 11, 12 and the slide bushes 13, 14 have extremely small slide resistance, and measurement can be made with a high level of positional precision. Moreover, the absence of friction-caused exothermicity allows the slide shafts 11, 12 and the slide bushes 13, 14 to be moved at high speeds in order to follow an object to be measured.

As described above, the use of the ceramic shafts 11, 12 and bushes 13, 14 together with the pneumatic bearings provides high-precision measurement. Alternatively, stainless steel slide shafts and bushes may be used in combination with rolling bearings in order to manufacture the precision-measuring apparatus 10 at reduced cost.

Then, a description will be made with reference to FIG. 1 as to how the linear movement distance-measuring means 18 is installed on the base 22.

The distance-measuring means 18 has the slide shaft 12, the slide bush 14, and the distance sensor 16 integrally assembled together. The slide shaft 12 is sideward inserted into the bush 14. The underside of the slide shaft 12 is fixedly supported at both ends 24, 25 thereof on respective pedestals 20, 21. The pedestals 20, 21 are fixed at lower ends thereof to the base 22. There exists a gap between the slide bush 14 and the base 22, and the slide bush 14 is movable in an axial direction of the slide shaft 12.

Figure 3:
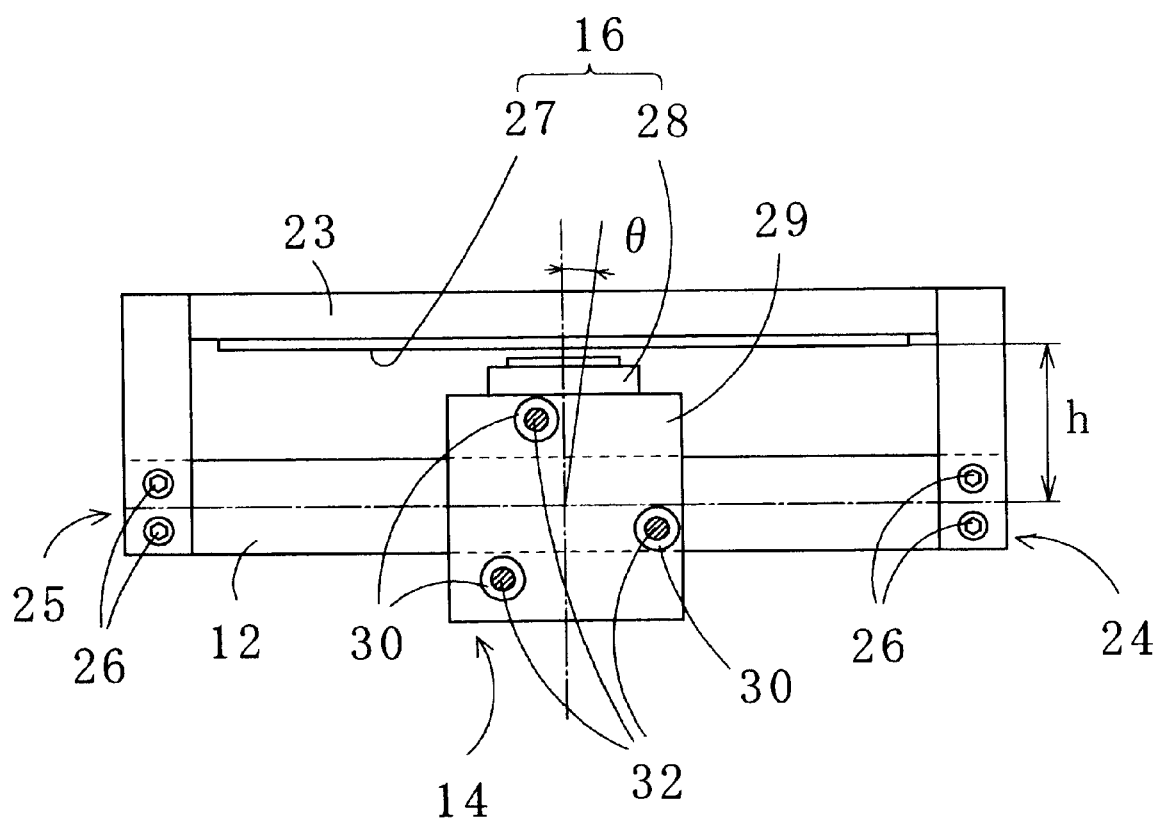
FIG. 3 is a descriptive illustration, depicting a distance sensor mounted on the precision-measuring apparatus.

As illustrated in FIGS. 1 and 3, a groove-shaped bracket 23 has both ends mounted respectively on both ends 24, 25 of the slide shaft 12 by means of bolts 26. The bracket 23 is open to one side when viewed from the top. There exists another gap between a central portion of the bracket 23 and a side surface of the slide bush 14. The bracket 23 has the central portion positioned parallel to the slide shaft 12.

The bracket 23 has a scale 27 mounted thereon opposite the slide bush 14. The scale 27 is positioned parallel to the slide shaft 12. The slide bush 14 has a read head 28 disposed on the side surface thereof opposite the bracket 23. The read head 28 is somewhat spaced apart from the scale 27 in an opposed relationship to the scale 27. The head 28 is able to read graduations on the scale 27. The distance sensor 16 includes the scale 27 and read head 28. The distance sensor 16 may be of a type designed to read the graduations using magnetism, light, or radio waves.

A further description will be made as to how the distance-measuring means 17 is mounted on the aforesaid distance-measuring means 18.

The measuring means 17 has the slide shaft 11, the slide bush 13, and the distance sensor 15 integrally built together.

Figure 4:
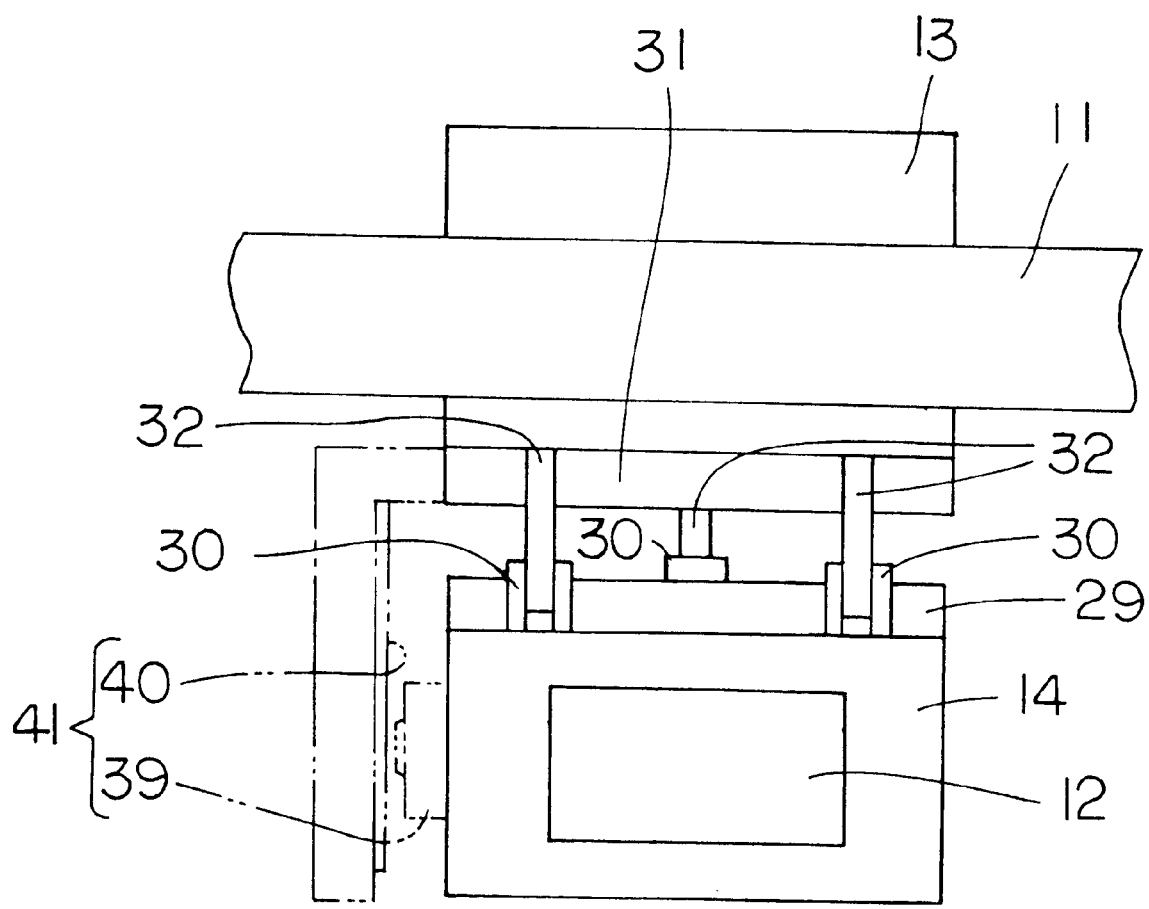
FIG. 4 is a cross-sectional view, illustrating first and second linear movement distance-measuring means connected together in the precision-measuring apparatus.

As illustrated in FIGS. 1, 3, and 4, a fixed plate 29 is mounted on the top of the slide bush 14. In addition, the fixed plate 29 has three linear bearings (direct-acting bearings) 30 planted therein at evenly spaced intervals. The bearings 30 have respective axes oriented in a vertical direction of the precision-measuring apparatus 10.

A bracket 33 has both ends mounted on both ends 31a, 32a of the slide shaft 11. The bracket 33 is substantially identical in shape to the bracket 23. The bracket 33 has an opening directed toward the slide shaft 11. The bracket 33 further has a scale 34 mounted thereon opposite the slide bush 13. The scale 34 is positioned parallel to the slide shaft 11. The slide bush 13 has a read head 35 disposed on a side surface thereof. The read head 35 is rather spaced apart from the scale 34 so as to face the scale 34. The distance sensor 15 includes the scale 34 and read head 35.

A lifting plate 31 is mounted on the bottom of the slide bush 13 having the slide shaft 11 sideward inserted therein. The lifting plate 31 is provided with three lifting shafts (or, lifting guide shafts) 32. The lifting shafts 32 extend downward from under the lifting plate 31. The lifting shafts 32 are inserted into the linear bearings 30 (or slide bushes). Such insertion allows the distance-measuring means 17, 18 to be connected together so as to measure respective distances in intersecting directions, i.e., in a substantially perpendicular relationship to one another when viewed from the top. This structure allows the distance-measuring means 17, 18 to be relatively slidably mounted together in a state of being stacked one above another. Consequently, the lifting shafts 32 and linear bearings 30 are possible to absorb upward and downward movement of a spindle (not shown) of a machine tool (not shown). Accordingly, the distance-measuring means 17, 18 are isolated from vertical forces caused by the upward and downward movement of the spindle. As a result, precise measurement can be made.

A yet further description will be made as to a mechanism for connecting the distance-measuring means 17 and the spindle of the machine tool.

A plate-like mounting member 37 and the slide shaft 11 are joined together through the bracket 33 in an end-to-end relationship. More specifically, the mounting member 37 has both ends disposed respectively on both ends 31a, 32a of the slide shaft 11 through the bracket 33 by means of bolts 26. The mounting member 37 is defined with an elongated mounting hole 36. The elongated hole 36 extends vertically through the mounting member 37 and along a longitudinal direction of the slide shaft 11. A mounting shaft 38 is fitted to the elongated hole 36 by means of screws (not shown) so as to be locatable at different positions in a longitudinal direction of the elongated hole 36. The mounting shaft 38 is anchored to the spindle of the machine tool through a tool holder (not shown). More specifically, a clamping mechanism 37a is provided on the mounting shaft 38 at the bottom thereof. The clamping mechanism 37a is partially fitted into the elongated hole 36, thereby sandwiching the mounting member 37 in upward and downward directions of the precision-measuring apparatus 10. Consequently, there are cases where, e.g., one side of the slide shaft 11 considerably protrudes sideward from the slide bush 13, depending upon a moving direction or distance of the spindle of the machine tool, and is thereby slanted downward because of its own weight. In the present embodiment, the pneumatic bearing is provided between the slide bush 13 and the slide shaft 11, and eccentric loads are exerted on the pneumatic bearing when the slide shaft 11 is angled downward. In order to avoid the above, the mounting shaft 38 is moved along the elongated hole 36 in a direction in which the slide shaft 11 protrudes outwardly. Then, the mounting shaft 38 is secured to the elongated hole 36 at an appropriate position thereof. In this state, the mounting shaft 38 distributes and supports loads that are imposed on the slide shaft 11. The slide shaft 11 is smoothly slidable on the slide bush 13. As previously mentioned, the spindle to be measured is anchored to the distance-measuring means 17 through the mounting shaft 38 and the mounting member 37, thereby making it possible to measure trajectories of the spindle moving in the directions of X- and Y-axes.

Next, a description will be made as to how the precision-measuring apparatus 10 is used.

Initially, the precision-measuring apparatus 10 is installed on the base 22, while the mounting shaft 38 is secured to the spindle of the machine tool. More specifically, the mounting shaft 38 is anchored to the tool holder that is mounted on the spindle. Thereafter, the machine tool permits the spindle to draw a predetermined trajectory upon receipt of instructions from a NC controller. Then, the mounting shaft 38 follows movement of the spindle. Accordingly, the mounting shaft 38 is moved in a plane in accordance with the predetermined trajectory. The slide shaft 11 attached to the mounting shaft 38 through the mounting member 37 is linearly moved in the direction of the Y-axis with respect to the slide bush 13. In addition, the scale 34 is moved in union with the slide shaft 11. The read head 35 detects a relative position of the slide shaft 11 in the direction of the Y-axis relative to the slide bush 13. The read head 35 then sends out the detected relative position as an electric signal.

The slide bush 14 fitted beneath the slide bush 13 through the lifting shafts 32 and the linear bearings 30 is linearly moved in the direction of the X-axis in relation to the slide shaft 12. In addition, the read head 28 on the slide bush 14 is moved with the slide bush 14. The read head 28 detects graduations on the scale 27, thereby detecting a position of the slide bush 14 in the direction of the X-axis with respect to the slide shaft 12. The read head 28 outputs the detected relative position as an electric signal.

At this time, the lifting shafts 32 and the linear bearing 30 absorb an error in a position of the spindle moved in a direction of a Z-axis.

The outputted data on the relative positions in the directions of the X- and Y-axes is synthesized in a measurement controller (not shown), thereby providing positional coordinate data. The positional coordinate data measured at definite time intervals is collected to provide trajectory coordinate data. The trajectory coordinate data can be evaluated and compared by being either displayed on a display unit or printed on a sheet of paper. Alternatively, the trajectory coordinate data can be saved by an electromagnetic or electric method.

One variation example including an additional third sensor will now be described.

As indicated by a chain double-dashed line in FIG. 4, a read head 39 can be attached to the slide bush 14 on a side surface thereof. In addition, the lifting plate 31 can be fitted to an upper end of a bracket. The bracket has a scale 40 vertically disposed thereon. The bracket supports the scale 40 on the reverse side thereof. The scale 40 is rather spaced apart from the read head 39 in an opposed relationship to the read head 39. The read head 39 and the scale 40 form a distance sensor 41 (a third distance sensor). The presence of the distance sensor 41 makes it possible to measure a distance that the distance-measuring means 17 travels vertically relative to the distance-measuring means 18. Such a construction allows the precision-measuring apparatus 10 to measure a trajectory of the spindle moving in the direction of the Z-axis as well. Consequently, the precision-measuring apparatus 10 is possible to measure an object such as a robot arm which provides three-dimensional operation.

Another variation example including an additional third distance sensor will be described.

Figure 5:
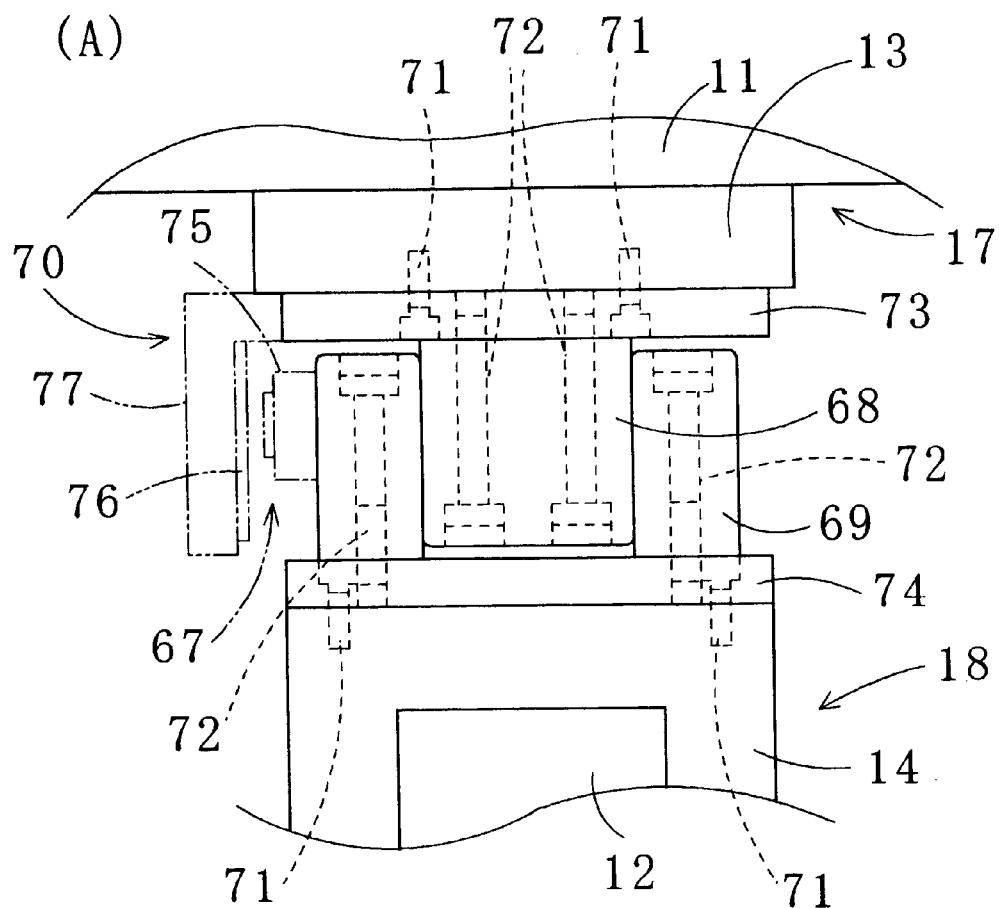
FIG. 5(A) is a cross-sectional view, depicting a third linear movement distance-measuring means connected to the first and second linear movement distance-measuring means.
FIG. 5(B) is a cross-sectional view, showing the third distance-measuring means connected to the first and second distance-measuring means.
Figure 5:
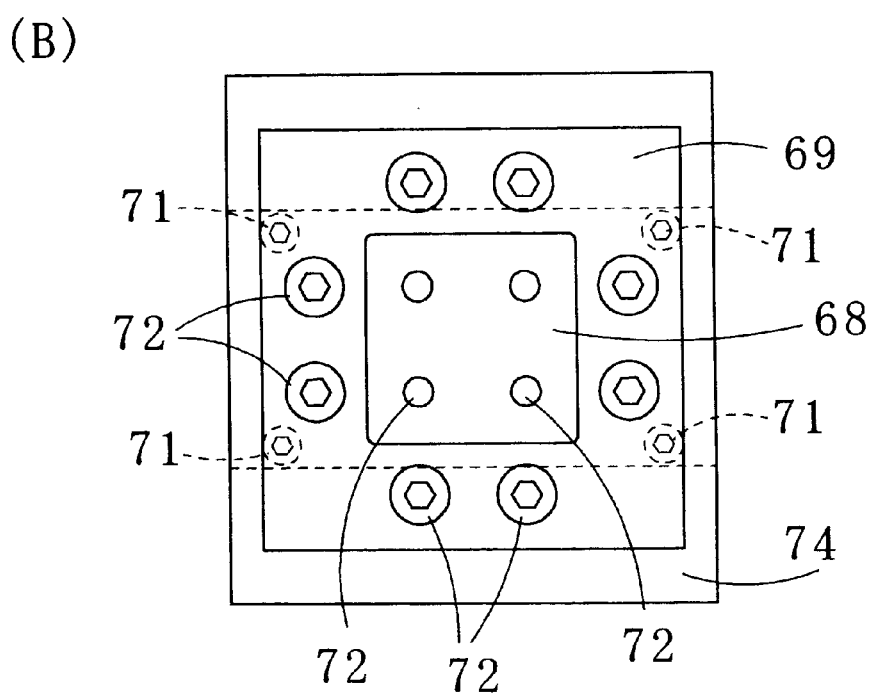

Referring to FIG. 5(A), a distance sensor 67 (a third distance sensor) is shown provided on a linear movement distance-measuring means 70 (a third linear movement distance-measuring means). As illustrated in FIGS. 5(A) and 5(B), the distance-measuring means 70 includes a slide shaft 68 (a third slide shaft) and a slide bush 69 (a third slide bush). The slide bush 69 has the slide shaft 68 slidably attached thereto. The distance sensor 67 is disposed so as to be able to measure a distance that the slide shaft 68 relatively moves relative to the slide bush 69. In addition, the distance-measuring means 70 is connected to the distance-measuring means 17, 18 in such a manner that they all measure respective distances in intersecting directions. Further, respective pneumatic bearings are formed at the slide positions between the slide shafts 11, 12, 68 and the slide bushes 13, 14, 69. The slide bushes 13, 14, and 69 are complementary to the slide shafts 11, 12, and 68, respectively.

The slide bushes 13, 14 have fixed plates 73, 74 respectively secured thereto by means of bolts 71. The slide bush 69 is secured to the fixed plate 74 by means of bolts 72.

The slide shaft 68 is anchored to the fixed plate 73 by means of the bolts 72. As shown by the chain double-dashed line, a read head 75 is fitted to the slide bush 69 on a side surface thereof. The fixed plate 73 is joined to a bracket 77 in a state of the side of the fixed plate 73 being fitted to an upper end of the bracket 77. The bracket 77 supports a vertically extending scale 76 on the reverse side thereof. The scale 76 is somewhat spaced apart from the read head 75 in an opposed relationship to the read head 75. This structure allows three shafts (i.e., the slide shafts and the slide bushes) travelling in the directions of the X-, Y-, and Z-axes to be supported on the respective pneumatic bearings. As a result, reduced errors in the vertical direction are achievable for two- and three-dimensional measurement.

Next, yet another variation example will be described as to a position where a distance sensor having improved measurement accuracy is mounted.

Figure 6:
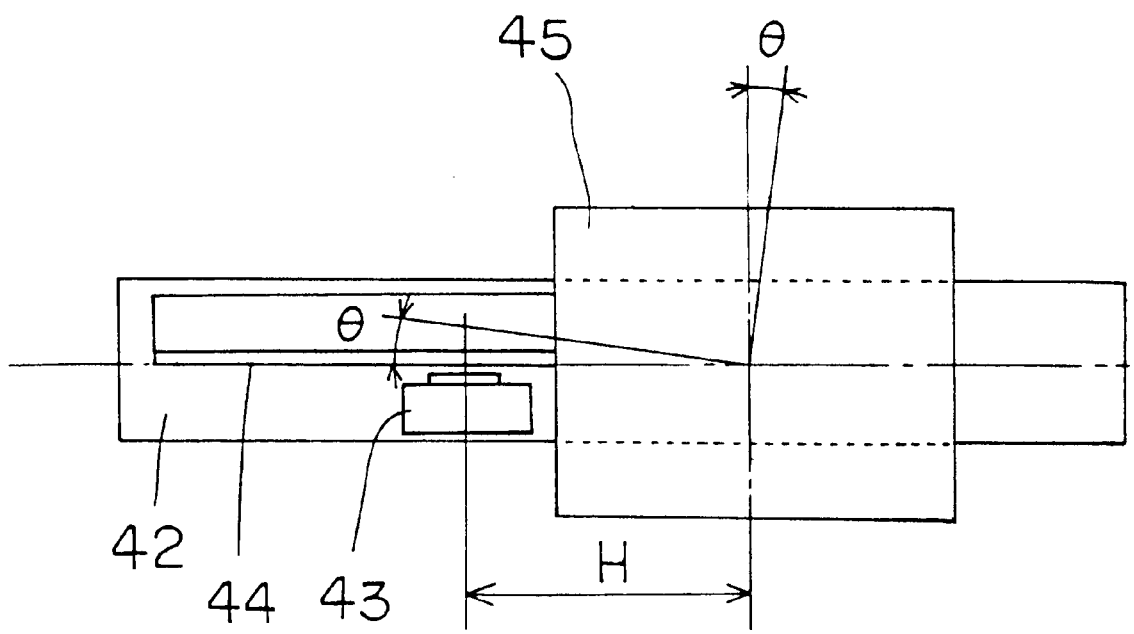
FIG. 6 is a plan view, illustrating a variation example in which a distance sensor is jointed to the precision-measuring apparatus.

Referring to FIG. 6, a read head 43 is shown disposed above a slide shaft (a second slide shaft) 42. The read head 43 is positioned slightly offset toward the left of FIG. 6 from the center of the slide shaft 42 in a longitudinal direction thereof. The read head 43 reads a distance in a state of being oriented in a direction toward an axis of the slide shaft 42, which axis is shown by a chine line in FIG. 6. A scale 44 is positioned in an opposed relationship to the read head 43. The scale 44 is fixed to a slide bush (a second slide bush) 45 at a side surface thereof in a state of a surface of the scale 44 being aligned with the axis of the slide shaft 42. When the slide bush 45 is shifted to the right and left, then the scale 44 is moved with the slide bush 45. At this moment, the read head 43 is able to read how far the slide bush 45 has traveled.

Then, measurement errors will be described on the basis of the Abbe's Principle. As illustrated in FIG. 3, in the preceding embodiment, when the slide bush 14 is slanted at minute angle $\Delta\theta$ in a state of the scale 27 being spaced apart from the center of the slide bush 14 by distance "h", then measurement error $\delta L1$ is equal to $h\Delta\theta$ ($\delta L1=h\Delta\theta$) because a distal end of the read head 28 is moved in the longitudinal direction of the scale 27.

Turning back to FIG. 6, in the present variation example, when the slide bush 45 is inclined at minute angle $\Delta\theta$ in a state of a measured point on the scale 44 being spaced apart from the center of the slide bush 45 by distance "H", then measurement error $\delta L2$ is equal to $H\Delta\theta^2/2$ ($\delta L1=h\Delta\theta^2/2$) because a read point on the scale 44 is moved in the same direction as that in which the read head 43 is oriented. Thus, with the same slant at $\Delta\theta$, such a structure as in the present variation example allows an error in measurement to result in a quadratic minute amount of minute angle $\Delta\theta$.

As seen from the above, observing the Abbe's Principle causes the slide shaft 42 and the scale 44 to linearly overlap one another. Consequently, a range of measurement is limited to being equal to or less than a half of the length of the slide shaft 42. When a wider range of measurement is desired, then the scale 27 may be disposed as practiced in the embodiment. When measurement accuracy is valued, then the scale 44 may be provided as described in the present variation example.

Next, variation examples of a means for interconnecting the first and second linear movement distance-measuring means will be described with reference to FIGS. 7(A)–7(C).

Figure 7:
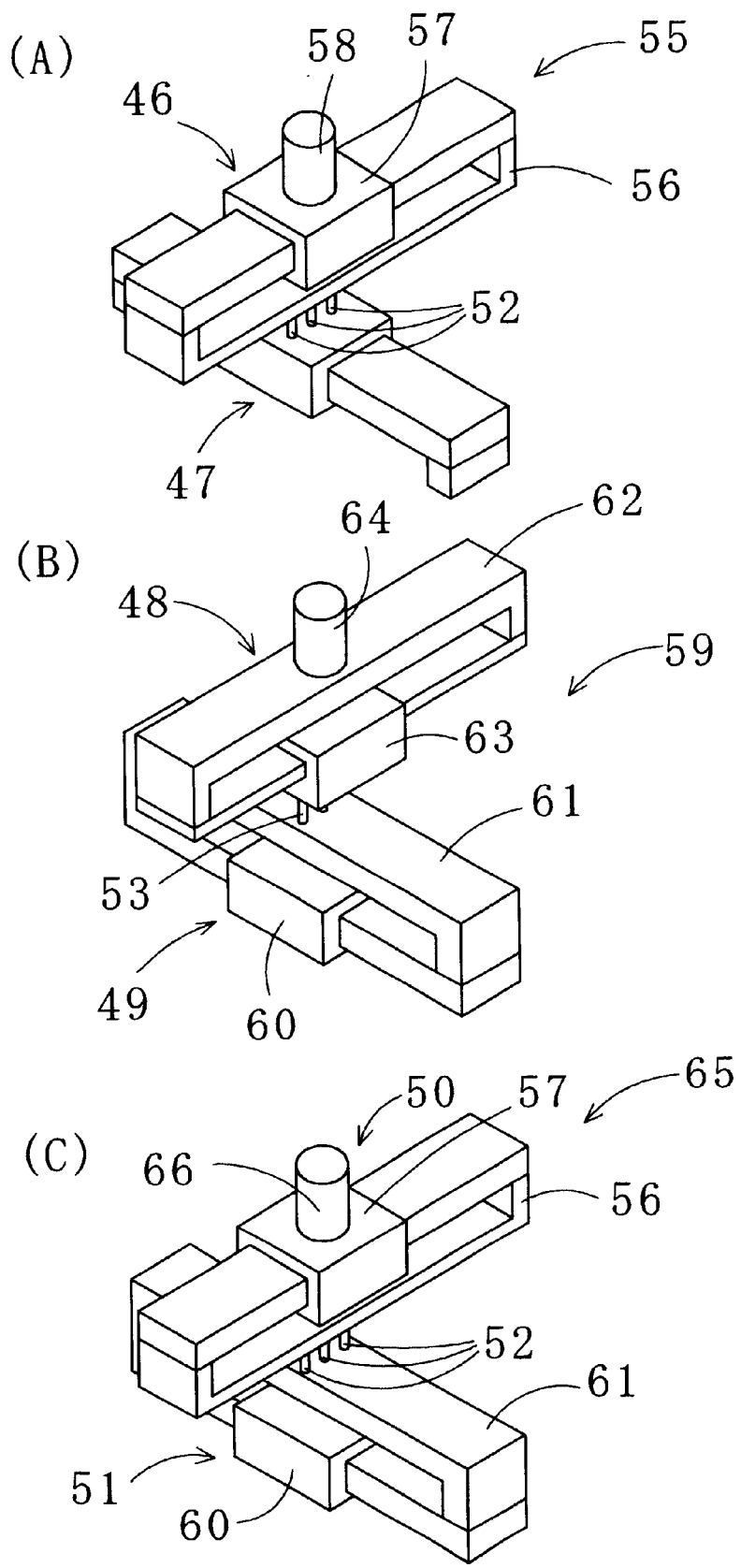
FIG. 7(A) is a perspective view, showing a variation example in which first and second linear movement distance-measuring means are connected together.
FIG. 7(B) is a perspective view, showing another variation example in which first and second linear movement distance-measuring means are connected together.
FIG. 7(C) is a perspective view, illustrating a further variation example in which first and second linear movement distance-measuring means are connected together.

As illustrated in FIG. 7(A), a machine tool precision-measuring apparatus 55 includes a pair of linear movement distance-measuring means 46, 47 (first and second linear movement distance-measuring means). The distance-measuring means 47 is substantially similar in construction to the linear movement distance-measuring means 18, and descriptions related thereto will be omitted. The distance-measuring means 46 has a bracket 56 directed downward. The bracket 56 has lifting shafts 52 mounted thereon. The distance-measuring means 46 is connected to the other distance-measuring means 47 through the lifting shafts 52. Respective distance sensors (not shown) are provided on the bracket 56 and a slide bush 57. A mounting shaft 58 is mounted on the slide bush 57 at the top thereof. The spindle of the machine tool is secured to the distance-measuring means 46 through the mounting shaft 58. The distance-measuring means 46, 47 are caused to travel in response to movement of the spindle. The distance-measuring means 47, 46 periodically or continuously measure respective distances that the mounting shaft 58 moves in the directions of the X- and Y-axes. The measured distances make it possible to measure trajectories of the spindle moving in the directions of the X- and Y-axes.

Turning now to FIG. 7(B), a machine tool precision-measuring apparatus 59 is shown including a pair of linear movement distance-measuring means 48, 49 (first and second linear movement distance-measuring means).

The distance-measuring means 49 has a slide bush 60 fixedly positioned on a base. The distance-measuring means 49 has a bracket 61 disposed above the slide bush 60. The distance-measuring means 48 is connected to the bracket 61 through a lifting shaft 53. Similar to the bracket 61, the distance-measuring means 48 has a bracket 62 positioned above a slide bush 63. A mounting shaft 64 is disposed on the bracket 62 at the top thereof. In addition, respective distance sensors (not shown) are mounted on the slide brackets 61, 62 and the slide bushes 60, 63. The slide bushes 60, 63 are positioned opposite the slide brackets 61, 62, respectively. A spindle of a machine tool is fixed to the distance-measuring means 48 through the mounting shaft 64. Movement of the spindle causes the distance-measuring means 48, 49 to be moved in union therewith. The distance-measuring means 49, 48 periodically or continually measure respective distances that the mounting shaft 64 travels in the directions of the X- and Y-axes. The measured distances make it feasible to measure trajectories of the spindle moving in the directions of the X- and Y-axes.

Turning now to FIG. 7(C), a machine tool precision-measuring apparatus 65 is shown including a pair of linear movement distance-measuring means 50, 51 (first and second linear movement distance-measuring means).

The distance-measuring means 50, 51 are substantially identical in structure to the aforesaid distance-measuring means 46, 49. Therefore, the same elements as those in the above description are identified by the same reference numerals, and further detailed description thereof will be omitted. The spindle of the machine tool is anchored to the distance-measuring means 50 through a mounting shaft 66. The mounting shaft 66 is disposed on the distance-measuring means 50. Movement of the spindle causes the distance-measuring means 50, 51 to be moved jointly therewith. Such a structure makes it feasible to measure trajectories of the spindle moving in the directions of the X- and Y-axes.

Although the present invention has been described with reference to the embodiment thereof, the present invention is not limited thereto. For example, according to the present embodiment, the first and second linear movement distance-measuring means are connected together in a state of the former being positioned above the latter. Alternatively, the first and second distance-measuring means may be changed in position.

In addition, according to the embodiment, the first and second distance-measuring means are moved in the perpendicular directions of the X- and Y-axes. Alternatively, it is only necessary that they be moved in different and intersecting directions.

Further, according to the present embodiment, the lifting mechanism including the lifting shafts and the linear bearings is positioned between the first and second distance-measuring means. Instead, the lifting mechanism may be disposed either between the spindle and the first distance-measuring means or between the second distance-measuring means and the base so as to be relatively slidable vertically.

Experiment

Figure 8:
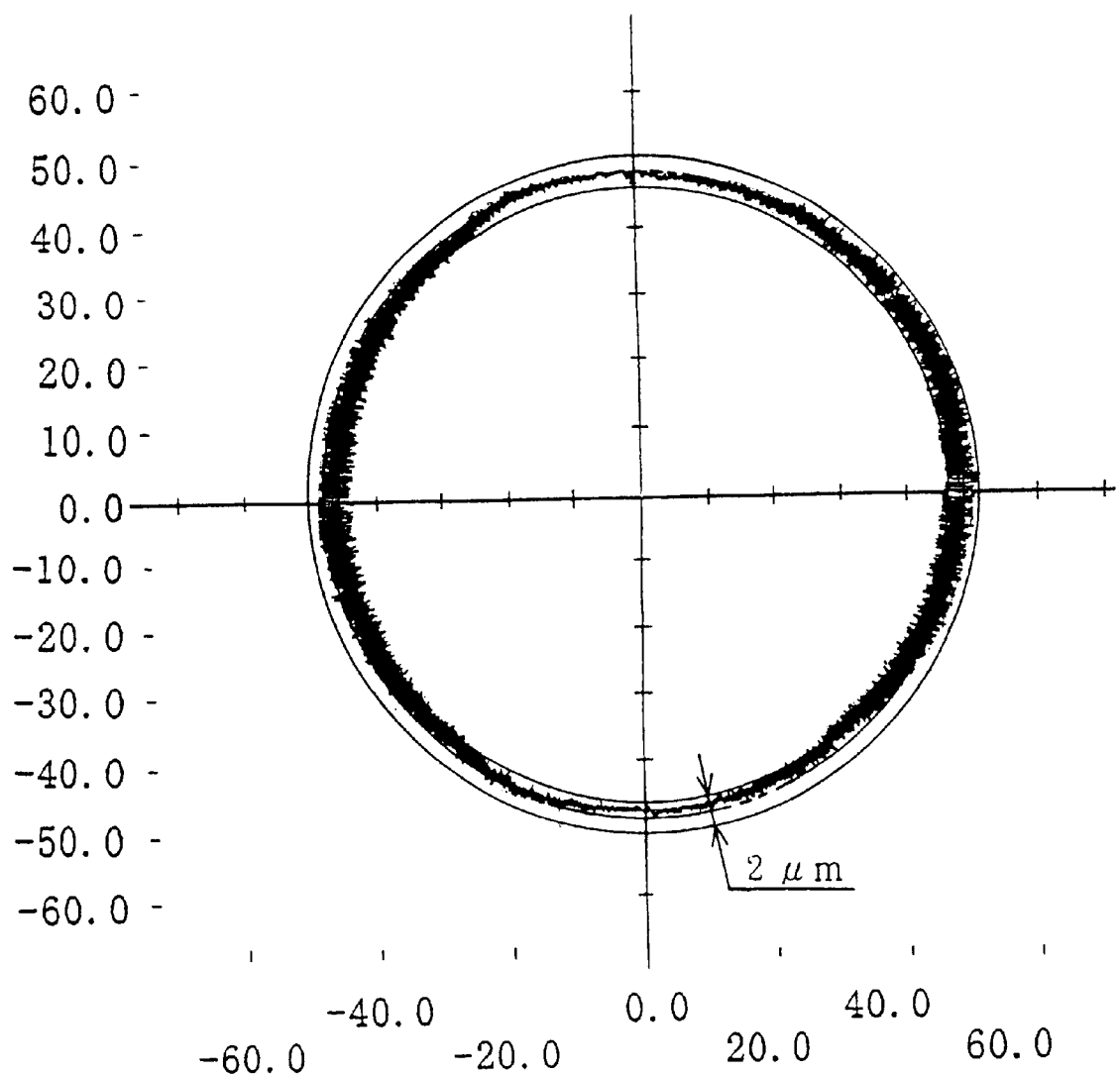
FIG. 8 is a graph, illustrating circular interpolation measurement errors in a measuring apparatus used in a comparison example.
Figure 9:
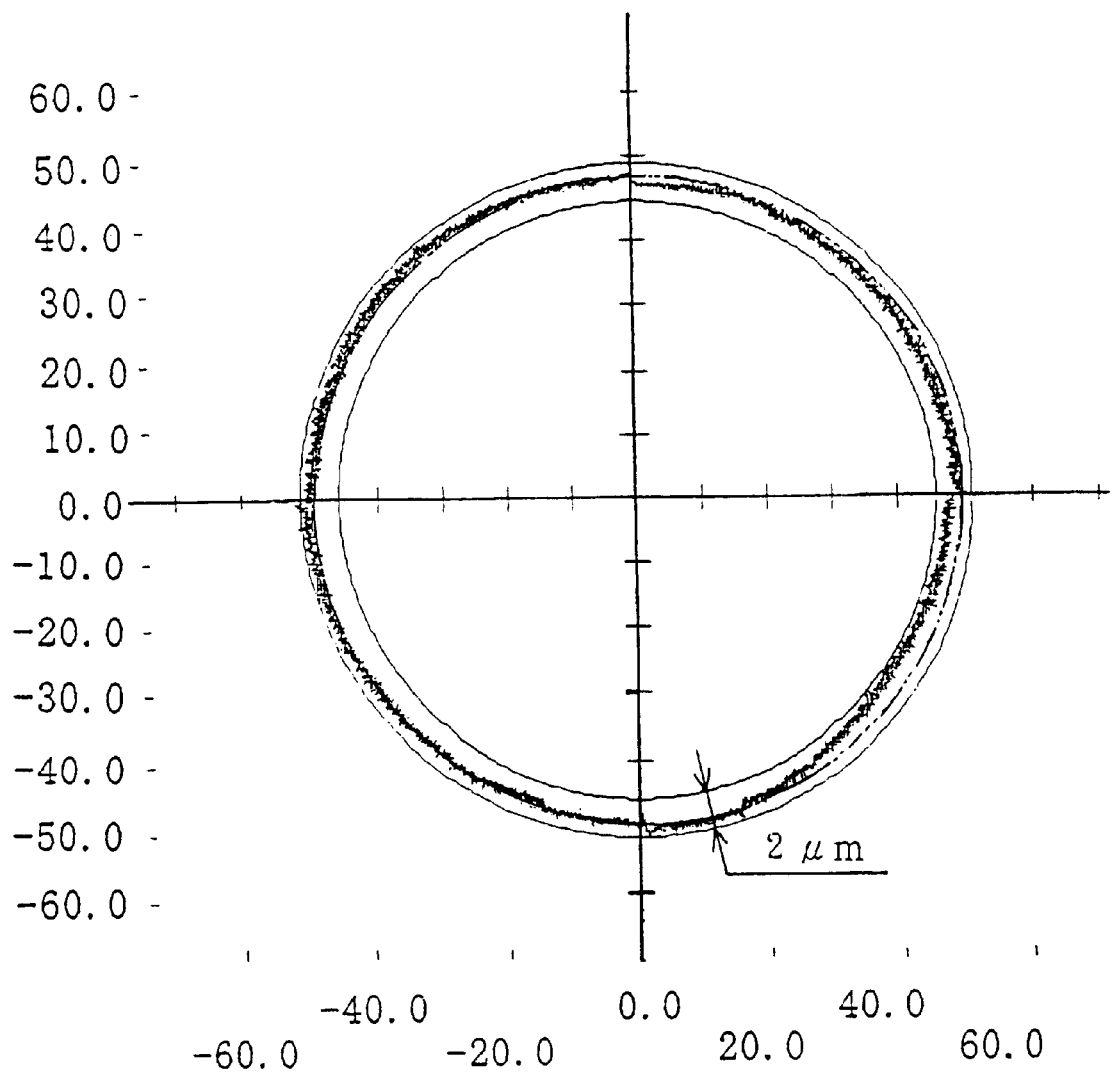
FIG. 9 is a graph, illustrating circular interpolation measurement errors in a machine tool precision-measuring apparatus employed in an experiment example; and, FIG. 10 is a perspective view, showing a prior art measuring apparatus.
Figure 10:
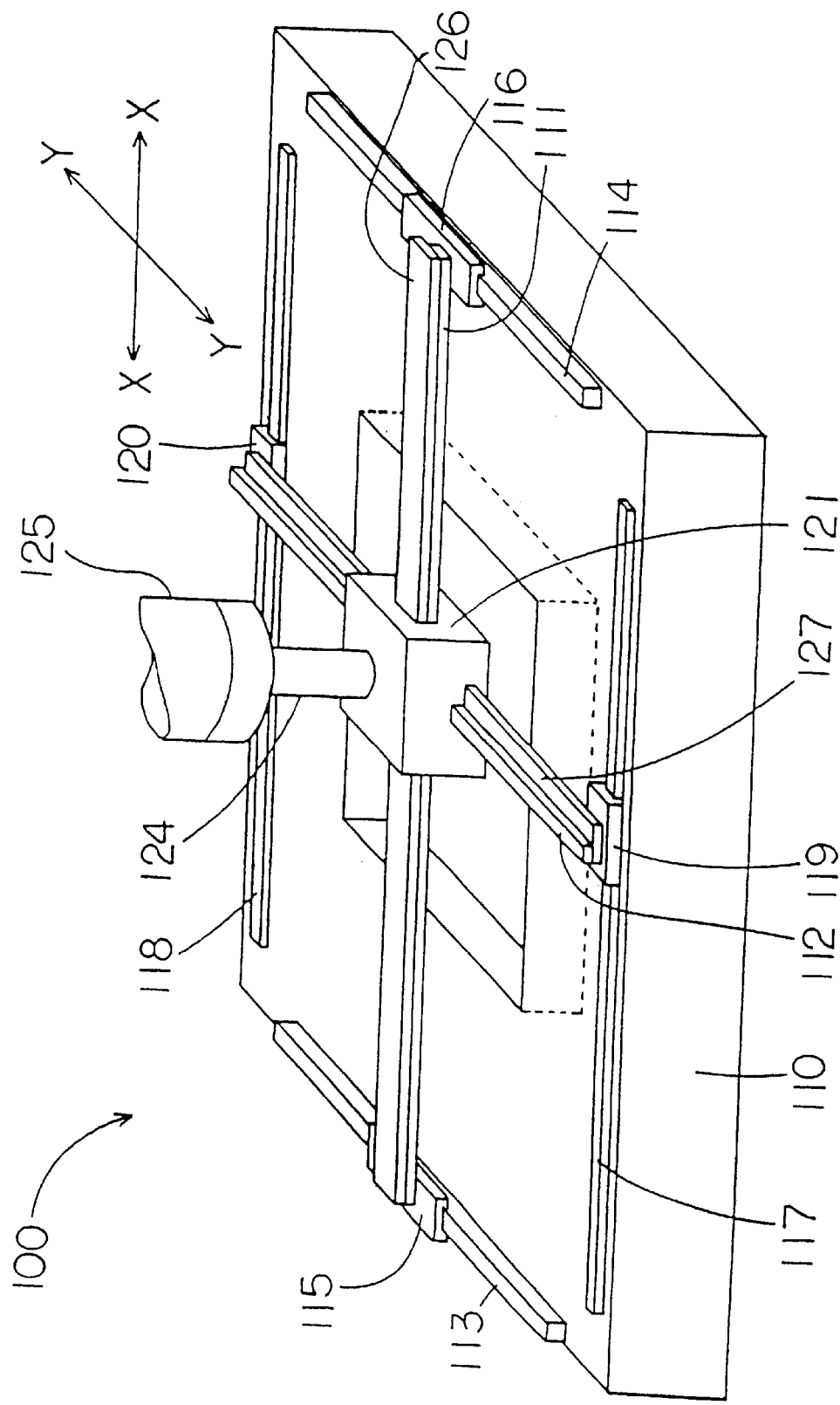

In order to assure operation and effects of the present invention, an experiment example will now be described in comparison with a prior art example. FIG. 8 illustrates the prior art example. FIG. 9 depicts the experiment example according to the present invention. In the prior art example, a conventional precision-measuring apparatus of a six-shaft type disclosed in published Japanese Patent Application No. (Hei) 11-58182 was used as a comparison example. This apparatus has slide portions replaced by pneumatic bearings in order to provide enhanced accuracy. A stream of air is permitted to flow through the pneumatic bearings. In the experiment example, a two-shaft type of a precision-measuring apparatus as given in the preceding embodiment was used.

In FIGS. 8 and 9, vertical and horizontal axes denote respective distances of movement in the directions of the X- and Y-axes from a starting point. In addition, errors deviated from a movement reference line as shown by the chain double-dashed line in the drawing are displayed on a magnified scale (1000 magnifications).

As illustrated in FIG. 8, circular interpolation errors were measured in the comparison example. As a result, it was possible to observe vibrations having amplitude of about 2 μm.

Similarly, as shown in FIG. 9, circular interpolation errors were measured in the experiment example. Similar to the prior art example, it was possible to observe vibrations having some 2 μm. Thus, it was assured that such a simple structure was possible to provide increased accuracy, as is the case with the six-shaft type of the precision-measuring apparatus.

In the experiment example, signals from the first and second distance sensors are properly amplified and then directly indexed by X- and Y-coordinates. Alternatively, the signals, of course, may be entered into a computer in order to be displayed on a monitor screen.

What is claimed is:

1. A machine tool precision-measuring apparatus comprising: a first linear movement distance-measuring means including a first slide shaft, a first slide bush slidably attached to said first slide shaft, and a first distance sensor for measuring a distance that said first slide shaft relatively travels with respect to said first slide bush; and, a second linear movement distance-measuring means including a second slide shaft positioned across said first slide shaft, a second slide bush connected to said first slide bush, said second slide bush being slidably attached to said second slide shaft, and a second distance sensor for measuring a distance that said second slide shaft relatively moves with respect to said second slide bush, wherein a spindle of a machine tool to be measured is fixed to said first linear movement distance-measuring means via a mounting shaft and a mounting member, said mounting shaft being fixed to said spindle, said mounting shaft being attached to said mounting member in a state of being locatable at different positions in a longitudinal direction of said mounting member, while said second linear movement distance-measuring means is fixedly positioned on a base, whereby trajectories of said spindle moving in directions of X- and Y-axes are measured.

2. A machine tool precision-measuring apparatus as defined in claim 1, wherein pneumatic bearings using compressed gases are formed between said first and second slide shafts and said first and second slide bushes respectively.

3. A machine tool precision-measuring apparatus as defined in claim 1, wherein said spindle is joined to said first linear movement distance-measuring means so as to be relatively slidable vertically with respect to said first linear movement distance-measuring means.

4. A machine tool precision-measuring apparatus as defined in claim 1, wherein said first linear movement distance-measuring means is attached to said second linear movement distance-measuring means so as to be relatively slidable vertically relative to said second linear movement distance-measuring means.

5. A machine tool precision-measuring apparatus as defined in claim 1, wherein said second linear movement distance-measuring means is fitted to said base so as to be relatively slidable vertically in relation to said base.

6. A machine tool precision-measuring apparatus as defined in claim 1, wherein said first linear movement distance-measuring means is attached to said second linear movement distance-measuring means so as to be relatively slidable vertically with respect to said second linear movement distance-measuring means, and wherein a third distance sensor is provided for measuring a distance that said first distance-measuring means travels upward and downward, whereby a trajectory of said spindle moving in a direction of a Z-axis is measurable as well.

7. A machine tool precision-measuring apparatus as defined in claim 6, wherein said third distance sensor is disposed on a third linear movement distance-measuring means so as to be able to measure a distance that a third slide shaft relatively travels with respect to a third slide bush, said third linear movement distance-measuring means including said third slide shaft and said third slide bush, said third slide shaft being slidably attached to said third slide bush, and wherein said third linear movement distance-measuring means is connected to said first and second linear movement distance-measuring means in a state of said first, second, and third linear movement distance-measuring means being caused to measure respective distances in intersecting directions, and further wherein pneumatic bearings using compressed gases are formed between said first, second, third slide shafts and said first, second, third slide bushes, respectively.

* * * * *